United States Patent [19]

Poirier et al.

[11] Patent Number: 5,417,171
[45] Date of Patent: May 23, 1995

[54] NO-TILL SEEDER AND FERTILIZER

[76] Inventors: Gerard H. Poirier; Bernard P. Poirier; Louis L. Poirier; Aurel A. Poirier; Emile P. Poirier; Gerard P. Poirier, all of Box 129, Antler Saskatchewan, Canada, S0C 0E0

[21] Appl. No.: 44,709

[22] Filed: Apr. 12, 1993

[51] Int. Cl.$^6$ .............................................. A01C 5/00
[52] U.S. Cl. ................................. 111/149; 111/142; 111/154; 111/186; 111/197
[58] Field of Search ............... 111/186, 149, 154, 142, 111/141, 148, 190, 197

[56] References Cited

U.S. PATENT DOCUMENTS

| 183,947 | 10/1876 | Lewis | 111/190 |
|---|---|---|---|
| 211,601 | 1/1879 | Springer | 111/190 |
| 221,004 | 10/1879 | Strayer | 111/190 |
| 2,747,492 | 5/1956 | Doskocil | 111/141 X |
| 2,920,587 | 1/1960 | Shriver | 111/186 X |
| 2,924,189 | 2/1960 | McLeod | 111/186 X |
| 2,968,266 | 1/1961 | Gustafson | 111/186 X |
| 3,122,111 | 2/1964 | Taylor, Sr. | 111/186 X |
| 4,207,823 | 6/1980 | Steilen et al. | 111/186 X |
| 4,417,530 | 11/1983 | Kopecky | 111/186 X |
| 5,139,954 | 8/1992 | Fetaz et al. | 111/186 X |

Primary Examiner—Randolph A. Reese
Assistant Examiner—Christopher J. Novosad
Attorney, Agent, or Firm—Murray E. Thrift; Adrian D. Battison; Stanley G. Ade

[57] ABSTRACT

A seed and fertilizer boot is mounted on a conventional cultivator shank. The boot has side-by-side fertilizer and seed tubes. One tube leads to a downwardly and rearwardly sloping delivery spout while the other delivery tube projects below the delivery spout. A flat knife is mounted on the front of the straight delivery tube to form a narrow furrow immediately in front of the associated delivery tube for receiving seed or fertilizer from the tube. The knife is adjustable along the tube so that its depth can be adjusted to compensate for wear. A second knife extends along the front face of the delivery spout to form a second furrow immediately beside the first furrow. This closes the first furrow and packs the soil onto the planted seed or fertilizer. The second knife also provides a shallower furrow for planting fertilizer or seed as the case may be. Like the first knife, the second knife is adjustable. Where desired, a skid-type packer can be mounted on the shank to close the furrows.

4 Claims, 4 Drawing Sheets

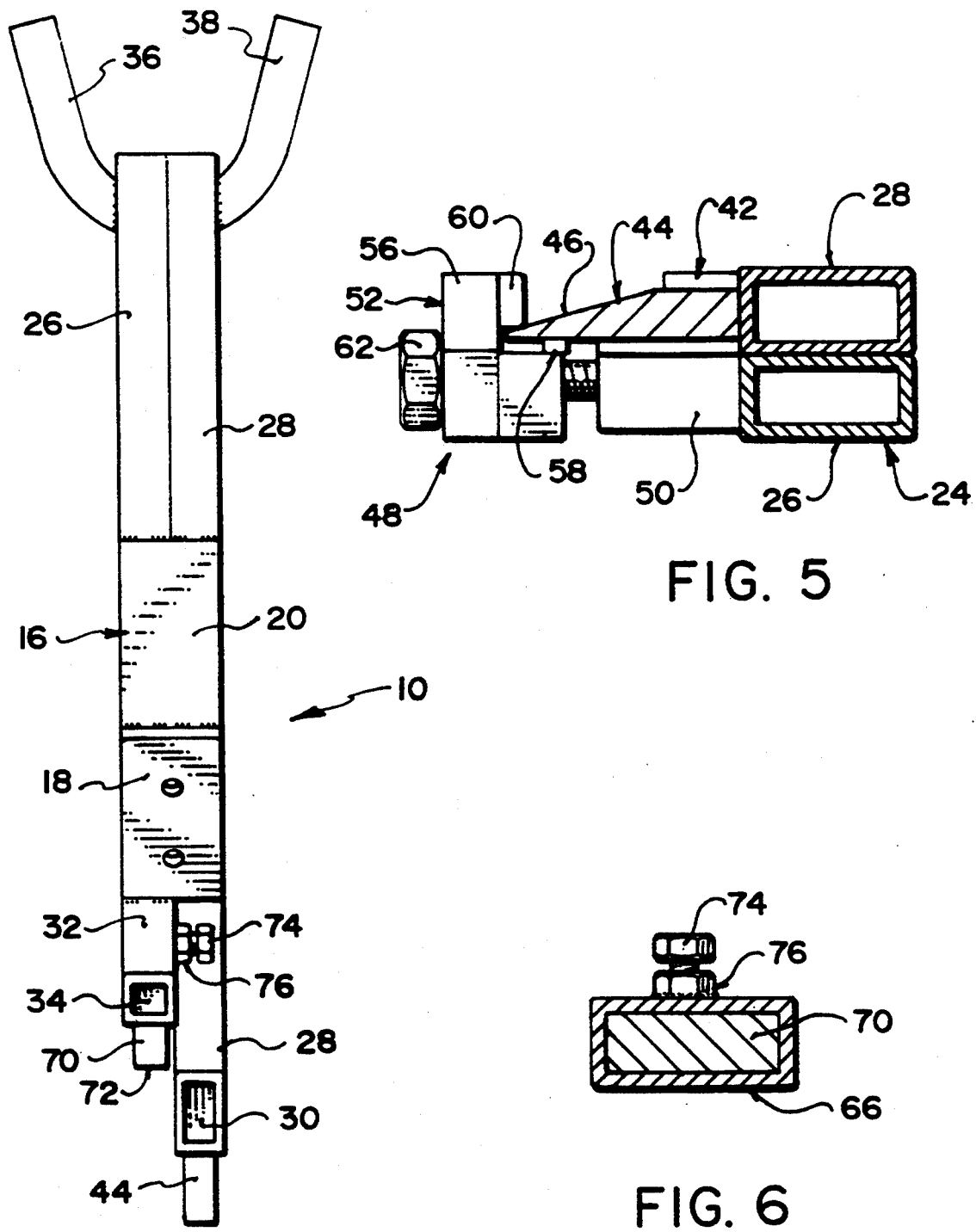

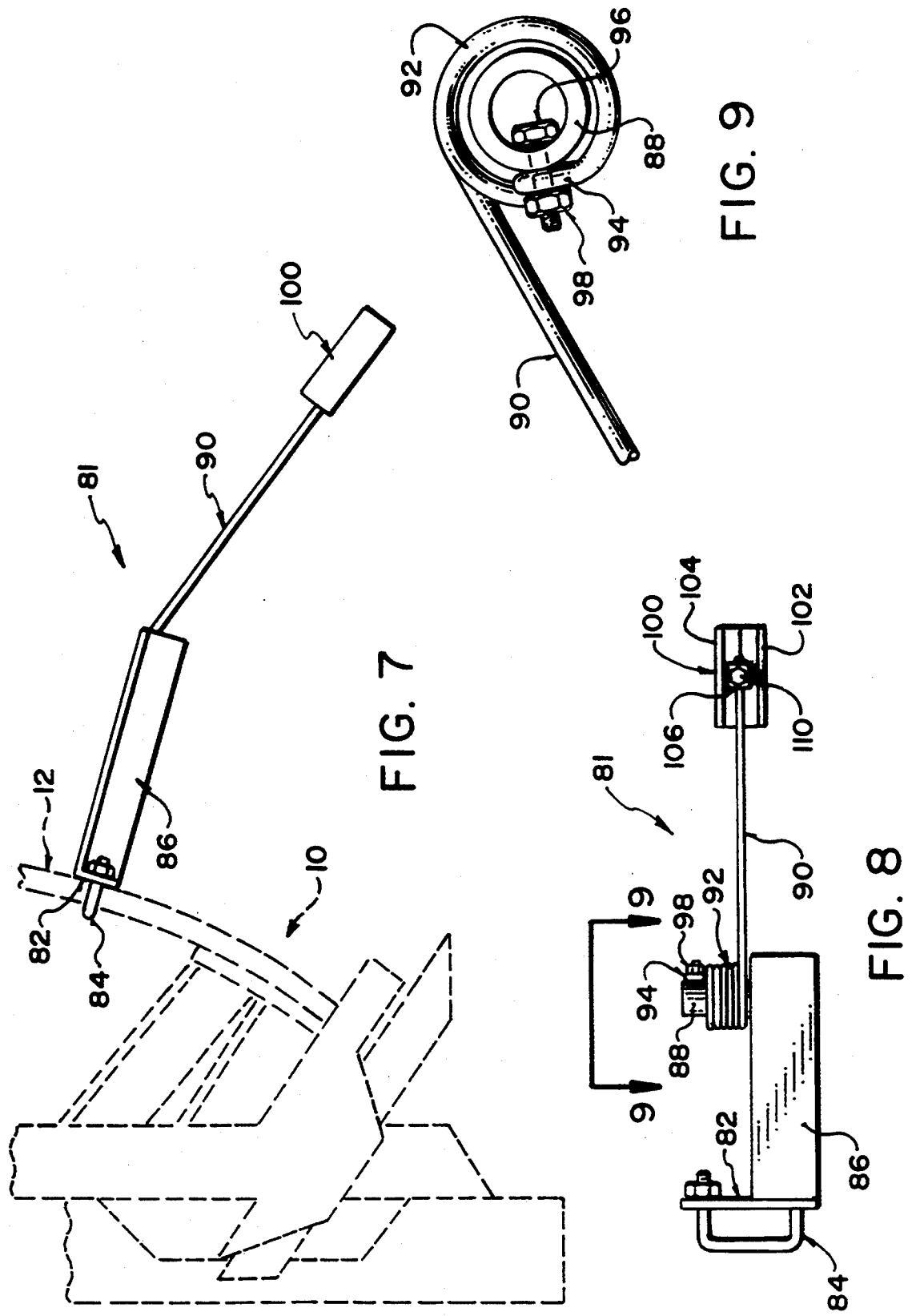

NO-TILL SEEDER AND FERTILIZER

FIELD OF THE INVENTION

The present invention relates to seed and fertilizer boots and more particularly to such boots used in no-till or minimum till or forming.

BACKGROUND

In no-till or minimum till seed and fertilizer placement, narrow furrows are opened in the soil for placement of the seed and fertilizer at different depths and a set spacing between the seed and fertilizer.

The present invention proposes a novel seed and fertilizer placement boot that is mountable on a conventional cultivator shank and provides the desired seed and fertilizer placement in a simple and effective manner. The invention also proposes a novel packer.

SUMMARY

According to one aspect of the present invention there is provided a seed and fertilizer boot comprising:
a fertilizer tube having an open bottom end;
a seed tube side-by-side with the fertilizer tube;
a seed delivery spout connected to the bottom end of the seed tube and sloping downwardly to the rear therefrom, the seed delivery spout having an open bottom end;
a fertilizer knife secured to and extending along the front side of the fertilizer tube so as to project below the bottom end of the fertilizer tube; and
a seed knife extending along the front side of the seed delivery spout so as to project below the open bottom end of the seed delivery spout.

According to another aspect of the present invention there is provided a seed and fertilizer assembly comprising:
a cultivator shank;
a seed boot secured to the cultivator shank and comprising:
an upright, rectangular fertilizer tube with an open bottom end, the bottom end sloping upwardly to the rear;
an upright rectangular seed tube side-by-side with the fertilizer tube;
a seed delivery spout secured to the bottom end of the seed tube and sloping downwardly and rearwardly therefrom, the spout having an open bottom end;
an elongate, flat fertilizer knife;
an elongate, flat seed knife;
first clamp means clamping the fertilizer knife on a front side of the fertilizer tube to extend therealong, the clamp means providing for adjustment of the knife along the tube;
second clamp means clamping the seed knife to the forward side of the delivery spout to extend therealong and to project therefrom, the second clamp means providing for adjustment of the seed knife along the delivery spout; and
mounting bracket means secured to the boot and securing the boot to the shank; and
a packer secured to the shank and comprising:
a rigid bracket projecting rearwardly from the shank;
a resilient arm mounted on the bracket and projecting rearwardly therefrom; and
a rigid packer skid secured to the resilient arm, the skid having a v-shaped profile and being positioned behind the seed and fertilizer tubes.

According to a further aspect of the present invention there is provided a packer for a seeder comprising:
a packer bracket;
means for mounting the bracket on a tool shank of the seeder;
a resilient arm mounted on the bracket and projecting rearwardly and downwardly therefrom; and
a rigid skid secured to the resilient arm at a distal end thereof.

BRIEF DESCRIPTION OF THE DRAWINGS

In the accompanying drawings, which illustrate an exemplary embodiment of the present invention:
FIG. 4 is a back view of the boot;
FIG. 5 is a view along line 5—5 of FIG. 1;
FIG. 6 is a view along line 6—6 of FIG. 2;
FIG. 7 is a side view of the packer;
FIG. 8 is a plan view of the packer;
and
FIG. 9 is a view along line 9—9 of FIG. 8.

DETAILED DESCRIPTION

Figure 1:
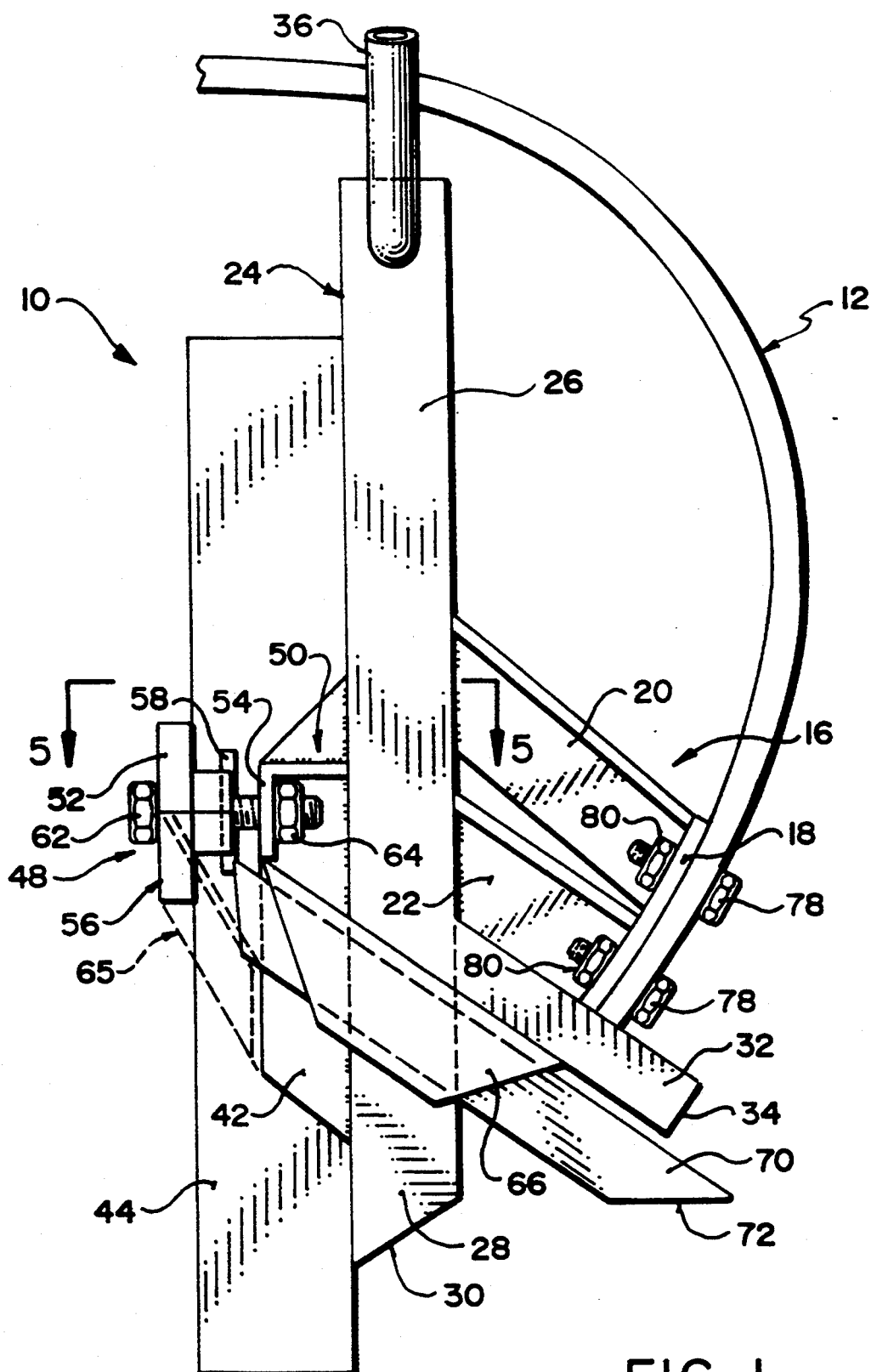
FIG. 1 is a side elevation of the boot from one side.
Figure 2:
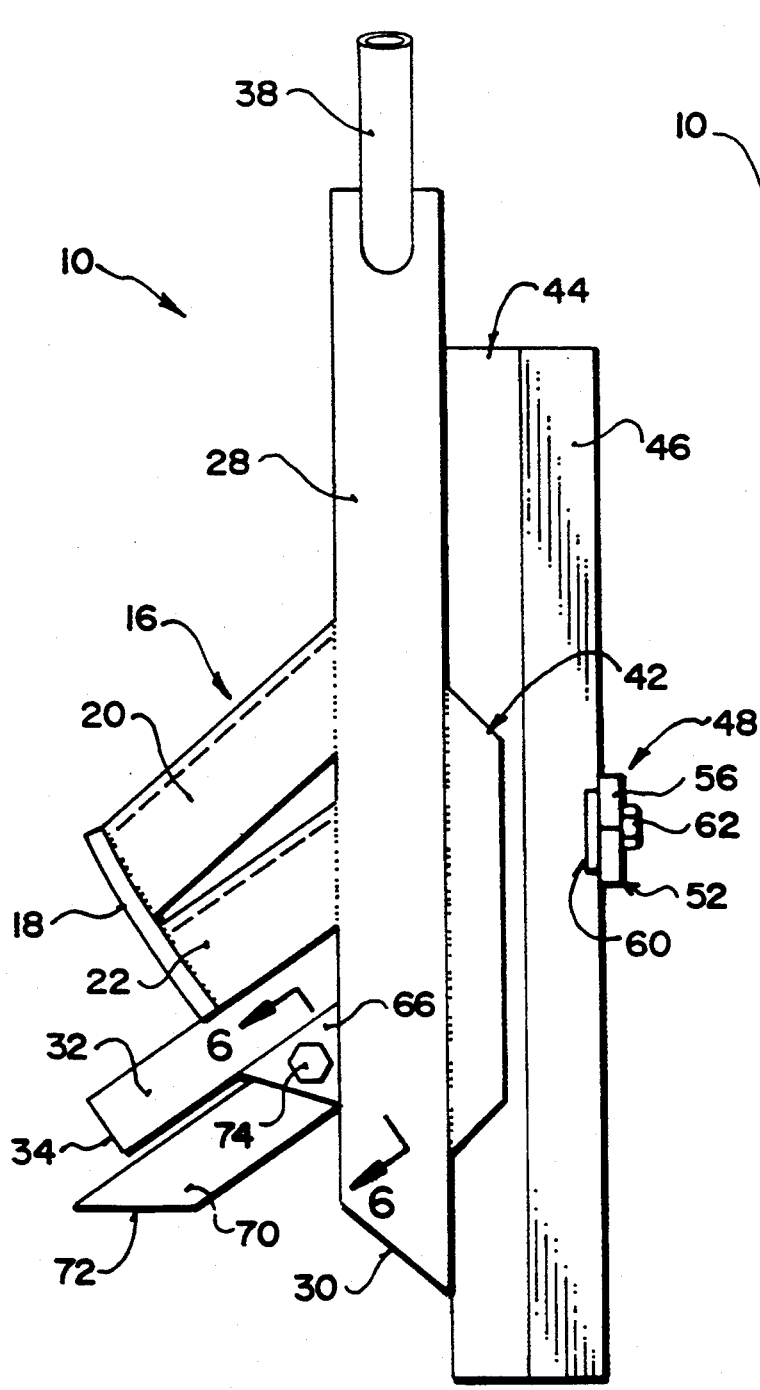
FIG. 2 is a side elevation of the boot from the opposite side.

Referring to the accompanying drawings, FIG. 1 illustrates a seed boot 10 mounted on a cultivator shank 12 of conventional construction. The configuration of the boot is most clearly illustrated in FIGS. 1 through 6. The boot includes a mounting bracket 16 that includes an arcuate plate 18 for engagement with the concave front side of the shank 12. Two struts 20 and 22 extend from the plate 18 to an upright boot tube assembly 24. This tube assembly includes a rectangular seed tube 26 and a rectangular fertilizer tube 28 arranged side-by-side. The fertilizer tube extends below the seed tube and has an open bottom end 30 that slopes upwardly to the rear. The bottom end of the seed tube is connected to a downwardly and rearwardly sloping seed spout 32 with an open bottom end 34. The top ends of the two tubes are closed. Two tubular inlet fittings 36 and 38 extend from the sides of the seed and fertilizer tubes 26 and 28 respectively and curve upwardly to opposite sides of the shank 12.

Along the front side of the fertilizer tube 28 is a forwardly open channel 42 that accepts a knife 44. The knife is generally flat and is aligned with the fertilizer tube, The knife has a bevelled leading edge 46 for cutting a narrow furrow immediately ahead of the fertilizer tube. The knife is held in position of the channel 42 by a clamp 48 that includes a bracket 50 mounted on the front of the seed tube and a clamp head 52. The bracket 50 includes a front flange 54 spaced from the front of the seed tube. The clamp head 52 includes a plate 56 extending across the front edge of the knife 44 and two ribs 58 and 60 that engage opposite sides of the bevelled edge 46. A bolt 62 extends through the plate 56 of the clamp head and the front flange 54 of the clamp bracket and is fastened in place using a nut 64. The clamping action produced by this arrangement includes a compressive for acting on the front edge of the knife and also a bending moment providing an additional frictional binding of the knife in the channel 42.

Along the bottom edge of the seed spout 32 is a knife tube 66. This has a generally horizontal bottom end spaced slightly above the bottom end of the seed spout. A knife 70 of rectangular section slides in the knife tube 66. The knife thus slopes downwardly along the leading side of the seed spout to a bottom knife 72 end that is oriented horizontally and below the open bottom end of the seed spout.

To retain the knife 70 in the knife tube 66, a clamping bolt 74 is threaded into a nut 76 secured to the side of the tube.

The tube assembly is mounted on the shank 12 using the conventional mounting holes in the shank and aligned mounting holes in the plate 18 of the mounting bracket 16. Bolts 78 and nuts 80 secure the boot in place on the shank with the fertilizer knife and the seed and fertilizer tubes 26 and 28 generally vertical.

In use of the boot, the fertilizer knife 44 is adjusted vertically to slice a narrow furrow to the depth required for placing the fertilizer. The fertilizer leaving the fertilizer tube then falls into the furrow immediately behind the knife. The following seed knife cuts a second furrow to the side of the fertilizer furrow, thus tending to close the fertilizer furrow over the fertilizer. Seed leaving the seed spout falls to the bottom of the seed furrow for proper placement above and slightly to one side of the fertilizer. The wide range of adjustability of the two knives allows the correct placement of fertilizer and seed both as to depth below the surface and relative depth with respect to one another. The adjustability also accommodates individual adjustment of the seed boots to ensure that fertilizer and seed placement is uniform for each boot mounted on a cultivator.

It has been found that the knives may conveniently be manufactured from the hard steel used for road grader blades. In fact, the preferred source of material for these knives is used grader blades that have been discarded, after the blades have been worn to the extent that they can no longer be used effectively on a grader. This provides an inexpensive, long wearing set of knives.

Figure 3:
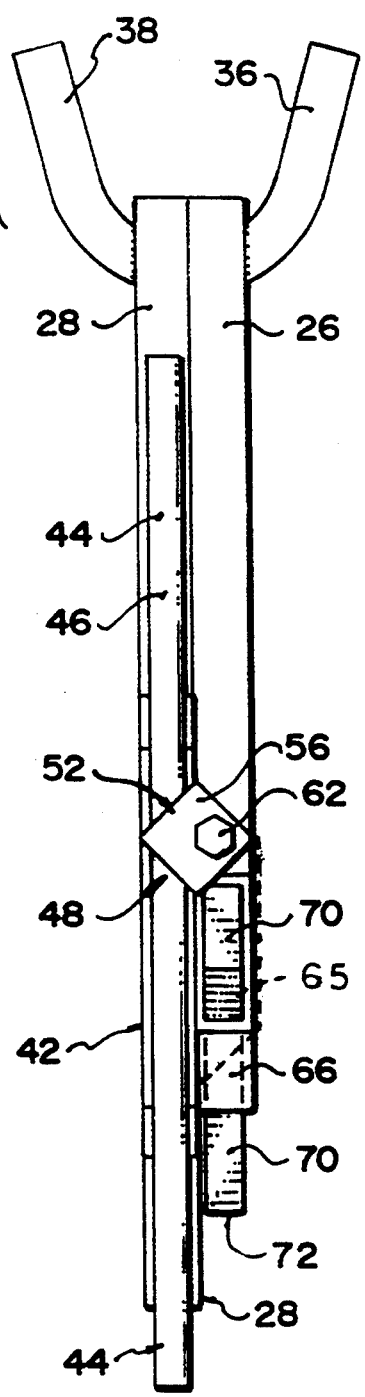
FIG. 3 is a front view of the boot.

A deflector plate 65, shown in broken line in FIGS. 1 and 3, may be fixed to the clamp plate 56 to extend down along the knife 44 and across the front of the knife tube 66. This serves to deflect and clear trash away from the front of the boot.

A packer especially useful in conjunction with the present is illustrated most particularly in FIGS. 7, 8 and 9. The packer 81 includes a mounting plate 82 that engages the back side of the shank 12 and a U-bolt 84 for securing the mounting plate to the shank. A rigid arm 86 projects to the rear of the mounting plate. The arm 86 carries a laterally projecting tube 88 that serves as a mount for a spring harrow tooth 90. The coil spring 92 of the tooth is positioned on the tube 88, with the eye 94 at the end of the coil secured to the tube by a bolt 96 and a nut 98. At the free end of the harrow tooth 90 is a packer skid 100. This is a right angle section with two flanges 102 and 104. The harrow tooth extends along the inside corner between those two flanges and through a socket 106 secured to the skid. A threaded bore in the side of the socket receives a set screw 110 for securing the packer skid in place on the harrow tooth. The skid can be used either as a V-shaped packer or it can be rotated to present one of its flat sides to the ground. In the latter case, the skid can be rotated after one end of one flange is worn and, when both flanges are worn at one end, the skid can be reversed to provide two additional skid surfaces.

While specific embodiments of the present invention have been described in the foregoing, it is to be understood that other embodiments are possible within the scope of the invention.

We claim:

1. A seed and fertilizer boot for delivering seed and fertilizer as the boot travels across a field in a forwards direction, said boot comprising:
 an upright first delivery tube having an open bottom end;
 an upright second delivery tube positioned transversely beside the first delivery tube, relative to the forwards direction;
 a delivery spout connected to the bottom end of the second delivery tube and sloping downwardly and rearwardly therefrom, the delivery spout having an open bottom end;
 an elongate, flat first knife;
 first clamp means adjustably clamping the first knife on a front side of the first delivery tube to extend therealong; and
 an elongate, flat second knife;
 second clamp means adjustably clamping the second knife along a front side of the delivery spout, behind and to one side of the first knife relative to the forwards direction.

2. A boot according to claim 1, wherein the bottom end of the first delivery tube is below the bottom end of the delivery spout.

3. A seed and fertilizer assembly comprising:
 a cultivator shank;
 a seed boot secured to the cultivator shank and comprising:
  an upright first delivery tube with an open bottom end, the bottom end sloping upwardly to the rear;
  an upright second delivery tube side-by-side with the first delivery tube;
  a delivery spout secured to the bottom end of the second delivery tube and sloping downwardly and rearwardly therefrom, the spout having an open bottom end;
  an elongate, flat first knife;
  an elongate, flat second knife;
  first clamp means clamping the first knife on a front side of the first delivery tube to extend therealong, the clamp means providing for adjustment of the knife along the tube;
  second clamp means clamping the second knife to a forward side of the delivery spout, the second knife extending along the delivery spout and projecting therefrom, and being positioned to one side of and behind the first knife, the second clamp means providing for adjustment of the second knife along the delivery spout; and
  mounting bracket means secured to the boot and securing the boot to the shank.

4. An assembly according to claim 2 wherein the first and second delivery tubes are of rectangular cross section.

* * * * *